US011908675B2

(12) United States Patent
Cheung et al.

(10) Patent No.: US 11,908,675 B2
(45) Date of Patent: Feb. 20, 2024

(54) CURVED ION GUIDES AND RELATED SYSTEMS AND METHODS

(71) Applicant: PERKINELMER SCIENTIFIC CANADA ULC, Woodbridge (CA)

(72) Inventors: Tak Shun Cheung, Woodbridge (CA); Chui Ha Cindy Wong, Woodbridge (CA); Hamid R. Badiei, Woodbridge (CA)

(73) Assignee: PERKINELMER SCIENTIFIC CANADA ULC, Woodbridge (CA)

( * ) Notice: Subject to any disclaimer, the term of this patent is extended or adjusted under 35 U.S.C. 154(b) by 68 days.

(21) Appl. No.: 17/672,167

(22) Filed: Feb. 15, 2022

(65) Prior Publication Data

US 2023/0260771 A1 Aug. 17, 2023

(51) Int. Cl.
*H01J 49/06* (2006.01)
*H01J 49/42* (2006.01)

(52) U.S. Cl.
CPC .......... *H01J 49/062* (2013.01); *H01J 49/063* (2013.01); *H01J 49/42* (2013.01)

(58) Field of Classification Search
CPC ........ H01J 49/062; H01J 49/063; H01J 49/42; H01J 49/066
USPC ...................................... 250/290, 292, 396 R
See application file for complete search history.

(56) References Cited

U.S. PATENT DOCUMENTS

| | | | | |
|---|---|---|---|---|
| 5,572,035 | A | 11/1996 | Franzen | |
| 7,375,344 | B2 | 5/2008 | Derrick et al. | |
| 8,084,750 | B2 | 12/2011 | Muntean | |
| 8,455,814 | B2 | 6/2013 | Loucks et al. | |
| 8,461,524 | B2 | 6/2013 | Dunyach et al. | |
| 8,552,366 | B2 | 10/2013 | Hoyes | |
| 9,236,235 | B2 | 1/2016 | Muntean et al. | |
| 9,589,781 | B2 | 3/2017 | Okumura | |
| 9,620,347 | B2 | 4/2017 | Zhang et al. | |
| 9,865,442 | B2 | 1/2018 | Giles et al. | |
| 10,460,920 | B1 * | 10/2019 | Smith | H01J 49/063 |
| 10,720,315 | B2 | 7/2020 | Taghioskoui | |
| 11,219,393 | B2 * | 1/2022 | Taghioskoui | H01J 49/065 |
| 2005/0258364 | A1 | 11/2005 | Whitehouse et al. | |
| 2009/0095898 | A1 | 4/2009 | Collings et al. | |
| 2009/0294663 | A1 * | 12/2009 | Muntean | H01J 49/063 250/292 |

(Continued)

FOREIGN PATENT DOCUMENTS

| | | | |
|---|---|---|---|
| EP | 2204840 | A2 | 7/2010 |
| WO | 2021037010 | A1 | 3/2021 |

OTHER PUBLICATIONS

International Search Report and Written Opinion for PCT/CA2023/050167 dated May 11, 2023, 16 pages.

*Primary Examiner* — Kiet T Nguyen
(74) *Attorney, Agent, or Firm* — Myers Bigel, P.A.

(57) ABSTRACT

An ion guide includes a plurality of curved electrodes arranged along a curved central axis. The plurality of electrodes define a curved ion guide region, with the curved ion guide region beginning at an ion entrance and ending at an ion exit. The ion guide includes an ion deflecting device configured to apply a radial DC electric field across the ion guide region and along the curved central axis. The ion guide region has a radius of curvature that varies along the curved central axis, and the radius of curvature is at a maximum at the ion entrance and decreases along the curved central axis toward the ion exit.

19 Claims, 7 Drawing Sheets

(56) References Cited

U.S. PATENT DOCUMENTS

| | | | |
|---|---|---|---|
| 2010/0301227 A1 | 12/2010 | Muntean | |
| 2011/0168882 A1* | 7/2011 | Hoyes | H01J 49/42 250/281 |
| 2011/0278450 A1 | 11/2011 | Loucks et al. | |
| 2012/0037814 A1 | 2/2012 | Lal et al. | |
| 2016/0181080 A1 | 6/2016 | Williams | |
| 2018/0005812 A1 | 1/2018 | Mavanur et al. | |
| 2018/0323050 A1 | 11/2018 | Smith et al. | |

* cited by examiner

CURVED ION GUIDES AND RELATED SYSTEMS AND METHODS

BACKGROUND

One or more ion guides may be used for guiding ions from a given source to a given destination in an instrument such as a mass spectrometer. The ion guide may be curved to provide ion optics with a longer length and more compact footprint.

SUMMARY

Some embodiments of the present technology are directed to an ion guide including a plurality of curved electrodes arranged along a curved central axis. The plurality of electrodes define a curved ion guide region, with the curved ion guide region beginning at an ion entrance and ending at an ion exit. The ion guide includes an ion deflecting device configured to apply a radial DC electric field across the ion guide region and along the curved central axis. The ion guide region has a radius of curvature that varies along the curved central axis, and the radius of curvature is at a maximum at the ion entrance and decreases along the curved central axis toward the ion exit.

In some embodiments, each electrode includes a coil or spring. The coil or spring may include resistance wire.

In some embodiments, each electrode includes a plurality of electrode segments, and adjacent electrode segments are axially spaced apart from one another along the curved central axis. Ends of adjacent electrode segments may axially overlap one another along the curved central axis.

In some embodiments, the ion deflecting device includes a DC voltage source configured to apply a DC voltage to at least one pair of the plurality of electrodes.

In some embodiments, the ion guide further includes an axial DC voltage source configured to apply an axial DC electric field along the curved central axis.

In some embodiments, the ion guide further includes a RF voltage generator configured to apply an RF voltage to at least one pair of the plurality of electrodes.

In some embodiments, the ion deflecting device includes a pair of opposing, curved ion deflecting electrodes extending parallel to the curved central axis. The ion deflecting device may further include a DC voltage source configured to apply a DC voltage of a first magnitude to one of the ion deflecting electrodes and a DC voltage of a second magnitude to the other one of the ion deflecting electrodes. The ion deflecting electrodes may be positioned outside the ion guide region.

Some other embodiments of the present technology are directed to a method for guiding an ion through an ion guide. The method includes transmitting the ion into a curved ion guide region of the ion guide, the ion guide region defined by a plurality of curved electrodes and having a central curved axis, the ion guide region beginning at an ion entrance and ending at an ion exit. The ion guide region has a radius of curvature that varies along the curved central axis, and the radius of curvature is at a maximum at the ion entrance and decreases along the curved central axis toward the ion exit. The method includes generating a radial DC electric field across the ion guide region and along the radius of curvature to provide an ion deflecting force.

In some embodiments, the method further includes generating an RF electric field across the ion guide region to focus the ion generally along the curved central axis.

In some embodiments, generating the radial DC electric field includes applying a DC voltage to at least one pair of the plurality of electrodes using a DC voltage source.

In some embodiments, a pair of opposing, curved ion deflecting electrodes extend parallel to the curved central axis outside the ion guide region. Generating the radial DC electric field may include applying a DC voltage of a first magnitude to one of the ion deflecting electrodes and a DC voltage of a second magnitude to the other one of the ion deflecting electrodes.

Some other embodiments of the present technology are directed to an ion guide including a plurality of curved electrodes arranged along a curved central axis. The plurality of electrodes define a curved ion guide region. The ion guide includes an ion deflecting device configured to apply a radial DC electric field across the ion guide region and along the curved central axis. Each electrode includes a coil or spring.

In some embodiments, the coil or spring includes resistance wire.

In some embodiments, the coil or spring has a constant circular cross section.

In some embodiments, each electrode includes a plurality of electrode segments each including a coil or spring, and adjacent electrode segments are axially spaced apart from one another along the curved central axis.

In some embodiments, the curved ion guide region begins at an ion entrance and ends at an ion exit, the ion guide region has a radius of curvature that varies along the curved central axis, and the radius of curvature is at a maximum at the ion entrance and is at a minimum the ion exit.

In some embodiments, the ion deflecting device includes a DC voltage source configured to apply a DC voltage to at least one pair of the plurality of electrodes.

In some embodiments, the ion guide further includes an axial DC voltage source configured to apply an axial DC electric field along the curved central axis to control axial ion velocity.

In some embodiments, the ion guide further includes a RF voltage generator configured to apply an RF voltage to at least one pair of the plurality of electrodes.

In some embodiments, the ion deflecting device includes a pair of opposing, curved ion deflecting electrodes extending parallel to the curved central axis. The ion deflecting device may further include a DC voltage source configured to apply a DC voltage of a first magnitude to one of the ion deflecting electrodes and a DC voltage of a second magnitude to the other one of the ion deflecting electrodes. The ion deflecting electrodes may be positioned outside the ion guide region.

Some other embodiments of the present technology are directed to an ion guide including a plurality of curved electrodes arranged along a curved central axis. The plurality of electrodes define a curved ion guide region. The ion guide includes an ion deflecting device configured to apply a radial DC electric field across the ion guide region and along the curved central axis. Each electrode includes a plurality of electrode segments. Adjacent electrode segments are axially spaced apart from one another along the curved central axis, and ends of adjacent electrode segments axially overlap one another along the curved central axis.

In some embodiments, the curved ion guide region begins at an ion entrance and ends at an ion exit, the ion guide region has a radius of curvature that varies along the curved central axis, and the radius of curvature is at a maximum at the ion entrance and is at a minimum the ion exit.

In some embodiments, the ion deflecting device includes a DC voltage source configured to apply a DC voltage to at least one pair of the plurality of electrodes.

In some embodiments, the ion guide further includes an axial DC voltage source configured to apply an axial DC electric field along the curved central axis to control axial ion velocity.

In some embodiments, the ion guide further includes a RF voltage generator configured to apply an RF voltage to at least one pair of the plurality of electrodes.

In some embodiments, the ion deflecting device includes a pair of opposing, curved ion deflecting electrodes extending parallel to the curved central axis. The ion deflecting device may further include a DC voltage source configured to apply a DC voltage of a first magnitude to one of the ion deflecting electrodes and a DC voltage of a second magnitude to the other one of the ion deflecting electrodes. The ion deflecting electrodes may be positioned outside the ion guide region.

Some other embodiments of the present technology are directed to a collision cell or a dynamic reaction cell including any of the ion guides as described herein.

Further features, advantages and details of the present technology will be appreciated by those of ordinary skill in the art from a reading of the figures and the detailed description of the embodiments that follow, such description being merely illustrative of the present technology.

DETAILED DESCRIPTION

The inventors have recognized and appreciated that curved ion guides create issues in certain instruments because the ions entering the ion guides may be moving at a high velocity such that many ions are not able to be confined and are lost. This reduces the available ions to be analyzed and therefore reduces the overall signal intensity measured by the instrument. Conventional curved ion guides, which use solid rods to provide a circular ion beam path using DC and RF potentials, attempt to solve this problem by reducing the velocity of the ions prior to entering the curved ion guide or establishing a DC potential that attracts the ions to the center of the circle defined by the circular ion beam path. The inventors have recognized and appreciated that such solutions are cumbersome and expensive. Accordingly, some embodiments are directed to a curved ion guide that is not circular in shape. For example, the ion path may spiral such that the initial curvature of the ion guide is less than the final curvature of the ion guide. When ions enter an ion guide with this configuration, the high velocity ions experience a more gradual curve in the initial curved path. In some embodiments, the curved ion guide includes a gas in the beam path causing collisions with the ions and resulting in a decreasing velocity as the ions continue along the beam path. In some embodiments, the radius of curvature of the ion beam path decreases along the beam path because the slower moving ions can be guided along a more highly curved path without substantial loss of the ions.

The inventors have also recognized and appreciated that having an ion guide with segmented rods results in discontinuities in the voltages of the rods along the ion path. Accordingly, in some embodiments, a gradual and continuous change in the DC potential is provided by the ion guide. In some embodiments, a continuous change in potential may be realized using overlapping adjacent electrodes. In other embodiments, the ion guide may use a coil or spring (e.g., resistive coil) to generate a potential that decreases along the length of the ion beam path.

The inventors have further recognized and appreciated that coils or springs (e.g., resistive coils) can be used to form curved ion guides with noncircular ion beam paths in a cost effective manner. Resistive coils are readily available, cheap, easy to bend and shape, fast to fill with gas and vent gas, can have a circular cross-section, and are straightforward to mount on a surface, such as a printed circuit board. Accordingly, some embodiments are directed to ion guides that include coils or springs (e.g., resistive coils) to form the ion beam path.

Figure 1:
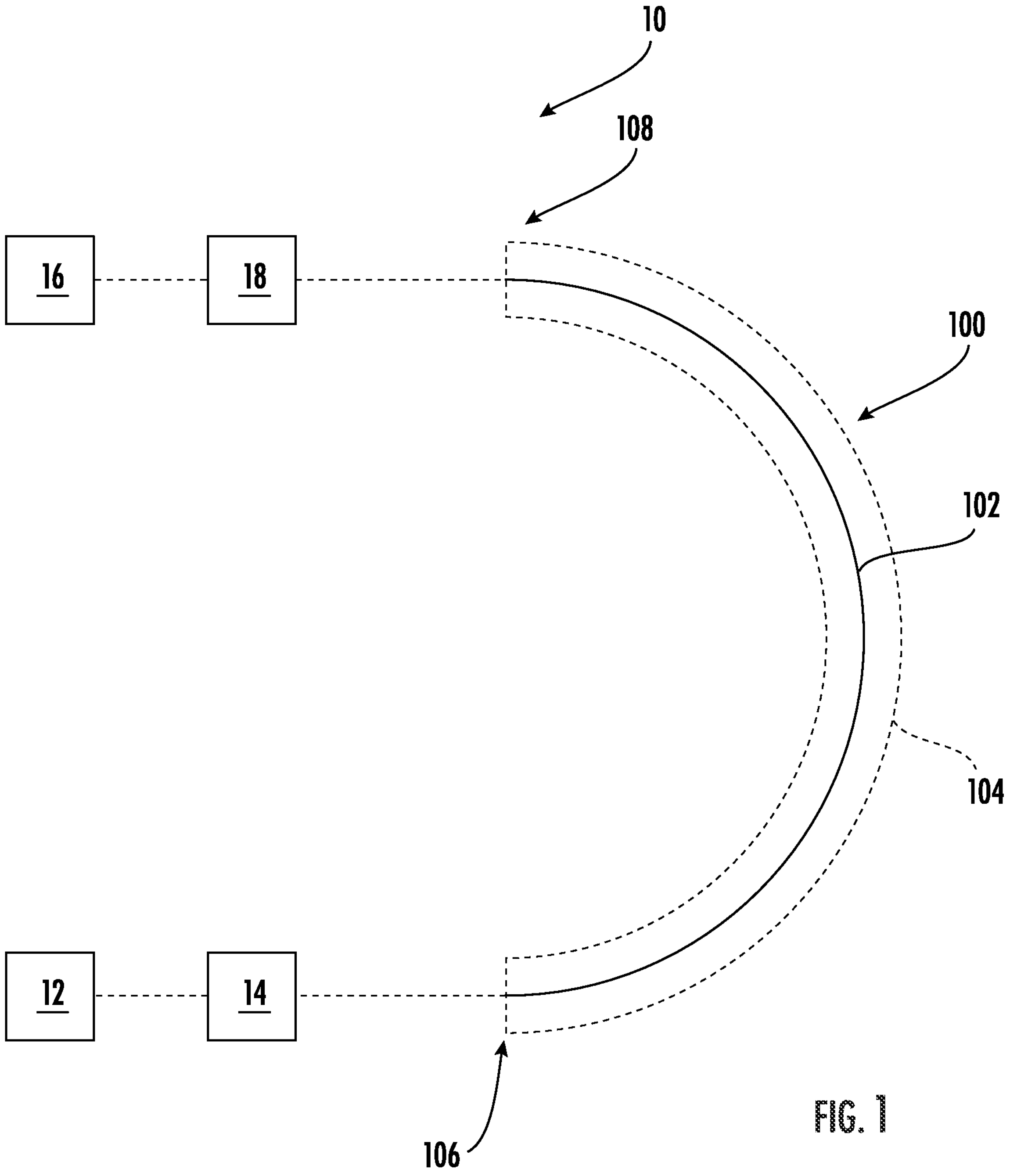
FIG. 1 is a schematic diagram of an ion guide and an associated ion processing system according to some embodiments.

FIG. 1 schematically illustrates an ion guide or ion guide assembly 100 that is included in an ion processing apparatus or system 10 according to some embodiments of the invention. The ion guide 100 may include a plurality of curved electrodes (see, e.g., FIG. 2) arranged about a curved central axis 102. The ion guide 100 may include a housing or frame 104 and/or other structure suitable for supporting the electrodes in a fixed arrangement along the central axis 102. In some embodiments, the housing 104 may provide an evacuated, low-pressure, or less than atmospheric pressure environment. The electrodes may be generally parallel to each other and to the central axis 102 and may be elongated along the central axis 102. The electrodes may define an interior space within the ion guide 100 that is likewise curved and elongated along the central axis 102. The opposite axial ends of the ion guide 100 respectively serve as an ion inlet 106 and an ion outlet 108. As understood by those skilled in the art, by the application of RF voltages to the electrodes, the electrodes generate a two-dimensional electrical restoring field that focuses ions generally along a curved path represented by the central axis 102. Only charged particles are influenced by the RF field, so when a particle stream including ions and neutral particles (e.g., gas particles, liquid droplets, etc.) enters the ion guide 100 via the ion inlet 106, the ions are constrained to motion in the vicinity of the central axis 102 while the neutral particles generally continue on a straight path. Therefore, ions exit the ion guide 100 via the ion outlet 108 while neutral particles do not exit the ion guide 100 via the ion outlet 108.

The ion guides described herein may be utilized in any process, apparatus, device, instrument, system or the like for which a curved focused ion beam is contemplated for guiding ions from a given source to a given destination. The ion processing system 10 schematically illustrated in FIG. 1 may represent an environment in which the ion guide may operate. Thus, for example, the ion processing system 10 may generally include one or more upstream devices 12 and 14 and/or one or more downstream devices 16 and 18. The ion processing system 10 may be a mass spectrometry (MS) apparatus, device, or system configured to perform a desired MS technique. Thus, as a further example, the upstream device 12 may be an ion source and the downstream device 18 may be an ion detector, and the other devices 14 and 16 may represent one or more other components such as ion storage or trapping devices, mass sorting or analyzing devices, collision cells or other fragmenting devices, ion optics and other ion guiding devices, etc. Thus, for example, the ion guide may be utilized before a mass analyzer (e.g., as a Q0 device), or itself as an RF/DC mass analyzer, or as a collision or reaction cell (e.g., as a Q2 device) positioned after a first mass analyzer and before a second mass analyzer. Accordingly, the ion guide may be evacuated, or may be operated in a regime where collisions occur between ions and gas molecules (e.g., as a Q2 device in a high-vacuum GC-MS, an LC-MS, or an ICP-MS, etc.).

Figure 2:
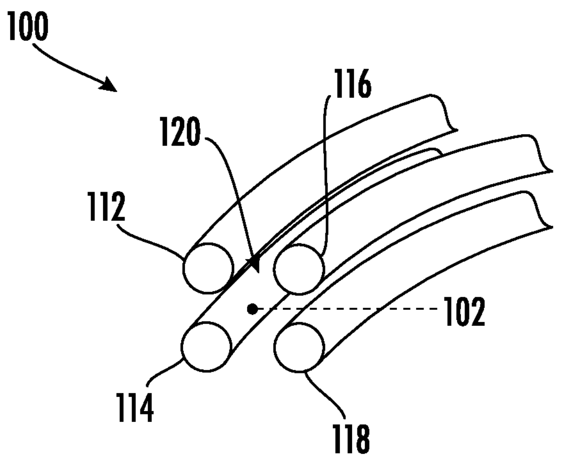
FIG. 2 is a perspective view of a portion of an ion guide according to some embodiments.

FIG. 2 is a perspective view of a portion of the ion guide 100 that includes a set of generally parallel, curved ion guiding electrodes 112, 114, 116, and 118. The ion guide 100 may, for example, be utilized as the ion guide 100 described above and illustrated in FIG. 1 and as part of the accompanying the ion processing system 10. In the illustrated embodiment, the electrode set consists of four electrodes 112, 114, 116, and 118 to form a basic two-dimensional, quadrupolar ion-focusing (or ion-guiding) field. In other embodiments, additional electrodes may be included (e.g., a hexapolar or octopolar configuration). Each electrode 112, 114, 116, and 118 is typically spaced at the same radial distance from the central axis 102 as the other electrodes 112, 114, 116, and 118. The illustrated electrode set may be considered as including two pairs of opposing electrodes. That is, the electrodes 112 and 118 oppose each other relative to the central axis 102, and the electrodes 114 and 116 oppose each other relative to the central axis 102. Typically, the opposing pair of electrodes 112 and 118 is electrically interconnected, and the other opposing pair of electrodes 114 and 116 is electrically interconnected, to facilitate the application of an appropriate RF voltage signal that drives the two-dimensional ion guiding field as described further below.

The electrodes 112 and 114 may be considered as outer electrodes and the electrodes 116 and 118 may be considered as inner electrodes. The outer electrodes 112 and 114 are located farther from the center of curvature of the ion guide 100 than the inner electrodes 116 and 118. As described further below, in some embodiments the electrodes 112, 114, 116, and 118 function not only as ion guiding electrodes but also as ion deflecting electrodes. This may be accomplished by generating a direct (DC) voltage differential between the outer electrodes 112 and 114 and the inner electrodes 116 and 118, whereby a static DC ion deflecting field is oriented in the direction along the radius of curvature to bias ions generally toward the center of curvature (i.e., generally away from the outer electrodes 112 and 114 and generally toward the inner electrodes 116 and 118).

The electrodes 112, 114, 116, 118 may define a curved ion guide region 120. Referring to FIGS. 1 and 2, the curved ion guide region 120 may begin at the ion entrance 106 and end at the ion exit 108.

Figure 3:
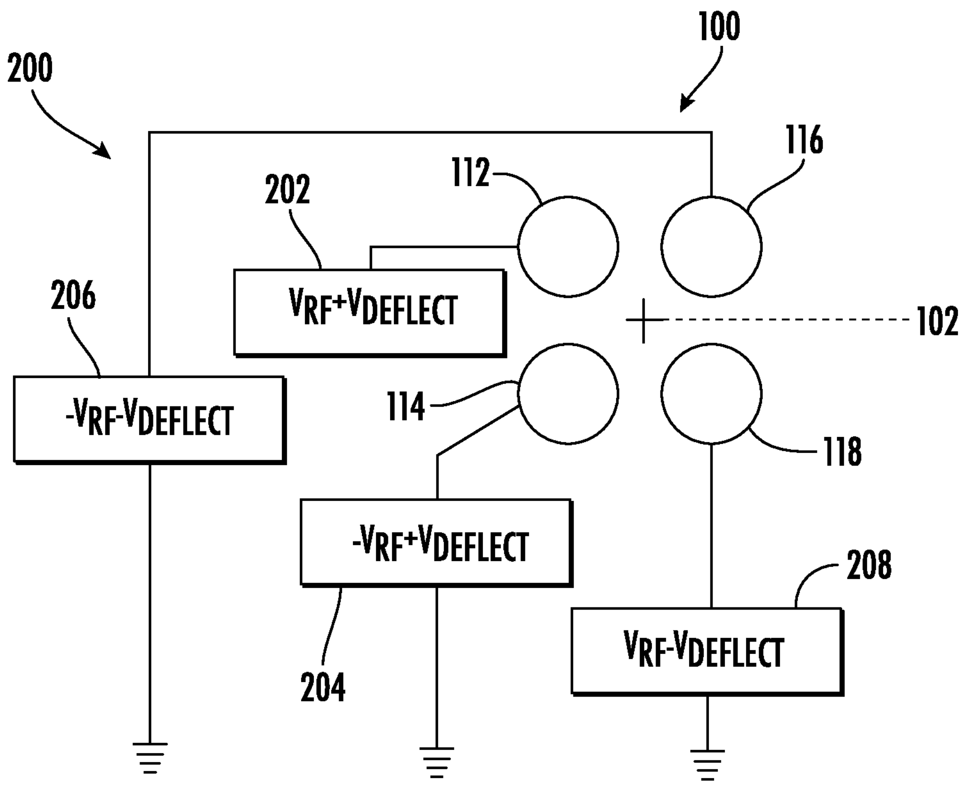
FIG. 3 is a schematic diagram of example circuitry that may be used with the ion guide of FIG. 2.

FIG. 3 is a simplified schematic view of example circuitry 200 that may be placed in communication with the electrodes 112, 114, 116, and 118 of the ion guide 100. The circuitry 200 generally includes a device for applying a two-dimensional (or radial) RF guiding field across the ion guide region 120 defined within the arrangement of electrodes 112, 114, 116, and 118, and a device for applying a radial DC deflecting field across the ion guide region. These devices may be embodied in one or more DC and RF voltage sources or signal generators. It will be understood that such "sources" or "generators" may include hardware, firmware, analog and/or digital circuitry, and/or software as needed to implement the desired functions of the devices. The specific components and circuit elements utilized for implementing the DC and RF fields are appreciated by those skilled in the art and thus are not detailed herein. FIG. 3 schematically groups the various RF and DC voltage sources into combined functional elements 202, 204, 206, and 208 placed in electrical signal communication with corresponding electrodes 112, 114, 116, and 118, thereby indicating the superposed RF and DC voltages applied. Thus, the voltage source 202 applies a composite voltage of $V_{RF}+V_{Deflect}$ to the electrode 112, the voltage source 204 applies a composite voltage of $-V_{RF}+V_{Deflect}$ to the electrode 114, the voltage source 206 applies a composite voltage of $-V_{RF}-V_{Deflect}$ to the electrode 116, and the voltage source 208 applies a composite voltage of $V_{RF}-V_{Deflect}$ to the electrode 118. It will also be understood that the circuitry 200 associated with the ion guide 100 may include an electronic controller. Such an electronic controller may be configured for controlling the operating parameters of the various voltage sources 202, 204, 206, and 208 utilized to apply the RF and DC fields. The electronic controller may also coordinate the operation of the ion guide 100 with other operative components of an ion processing system of which the ion guide 100 may be a part, such as the ion processing system 10 illustrated in FIG. 1.

In addition to the radial DC electric field, an axial DC electric field may be applied to the ion guide 100 along the central axis to control ion energy (e.g., axial ion velocity). An axial DC electric field may be particularly desirable in a case where ions being transmitted through the ion guide 100 experience collisions with neutral gas molecules (e.g., background gas). As appreciated by those skilled in the art, such collisions may be employed for ion fragmentation or for collisional cooling. A DC voltage source or sources may be utilized to generate the axial DC electric field. The DC voltage source or sources may communicate with one or more of the electrodes 112, 114, 116, and 118 or with an external field generating device such as, for example, one or more other conductive members (e.g., resistive traces) positioned along the ion guide axis 102, such as outside the top and/or bottom of the ion guide 100, and/or between the top electrodes 112 and 116 and/or the bottom electrodes 114 and 118, etc. This "axial" DC voltage source may be conceptualized as being a part of one or more of the functional elements 202, 204, 206, and 208 schematically depicted in FIG. 3.

Figure 4:
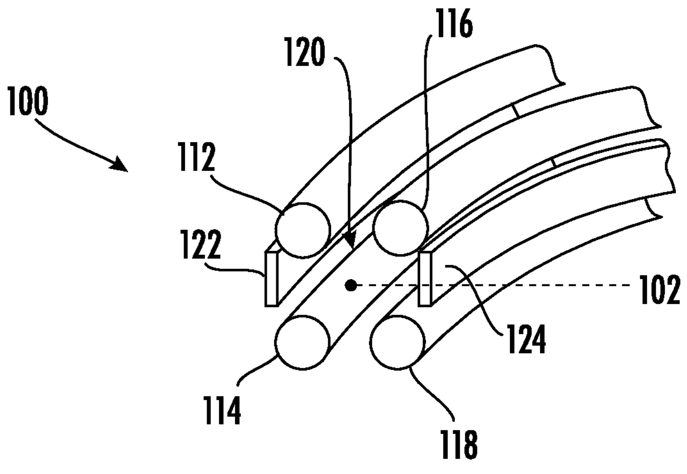
FIG. 4 is a perspective view of a portion of an ion guide according to some embodiments.

FIG. 4 is a perspective view of a portion of the ion guide 100 configured according to an alternative embodiment. The ion guide 100 may, for example, be utilized as the ion guide 100 described above and illustrated in FIG. 1 and as part of the accompanying the ion processing system 10. In the illustrated embodiment, the electrode set of the ion guide 100 includes four parallel, curved ion guiding electrodes 112, 114, 116, and 118 to form a basic two-dimensional, quadrupolar ion-focusing (or ion-guiding) field, with the understanding that additional ion guiding electrodes may be included as mentioned previously. The ion guiding electrodes 112, 114, 116, and 118 may be arranged relative to the central axis 102 in the same manner as described above in conjunction with FIGS. 2 and 3.

In the embodiment illustrated in FIG. 4, the ion guide 100 includes an ion deflection device that includes a pair of curved, parallel ion deflecting electrodes 122 and 124, which are provided in addition to the ion guiding electrodes 112, 114, 116, and 118. The ion deflecting electrodes 122 and 124 are arranged in parallel with each other and with the central axis 102. Hence, the deflecting electrodes 122 and 124 may also be parallel with the ion guiding electrodes 112, 114, 116, and 118. The ion deflecting electrodes 122 and 124 may be located in the ion guide 100 so as not to interfere with the ion guide region 120 defined within the interior of the ion guide 100 by the ion guiding electrodes 112, 114, 116, and 118, and so as not to interfere with the electrodynamic RF focusing field established by the ion guiding electrodes 112, 114, 116, and 118. Thus, in the illustrated embodiment, the ion deflecting electrodes 122 and 124 are located outside of the ion guide region 120.

In the present embodiment, the ion guide 100 deflects ions by generating a direct (DC) voltage differential between the ion deflecting electrodes 122 and 124, whereby a static DC ion deflecting field is oriented in the direction along the radius of curvature to bias ions generally toward the center of curvature (i.e., generally away from the outer electrodes 112 and 114 and generally toward the inner electrodes 116 and 118). The magnitudes and polarities of the applied DC voltages may be as described above in conjunction with the implementations associated with the ion guide 100 illustrated in FIGS. 2 and 3.

Figure 5:
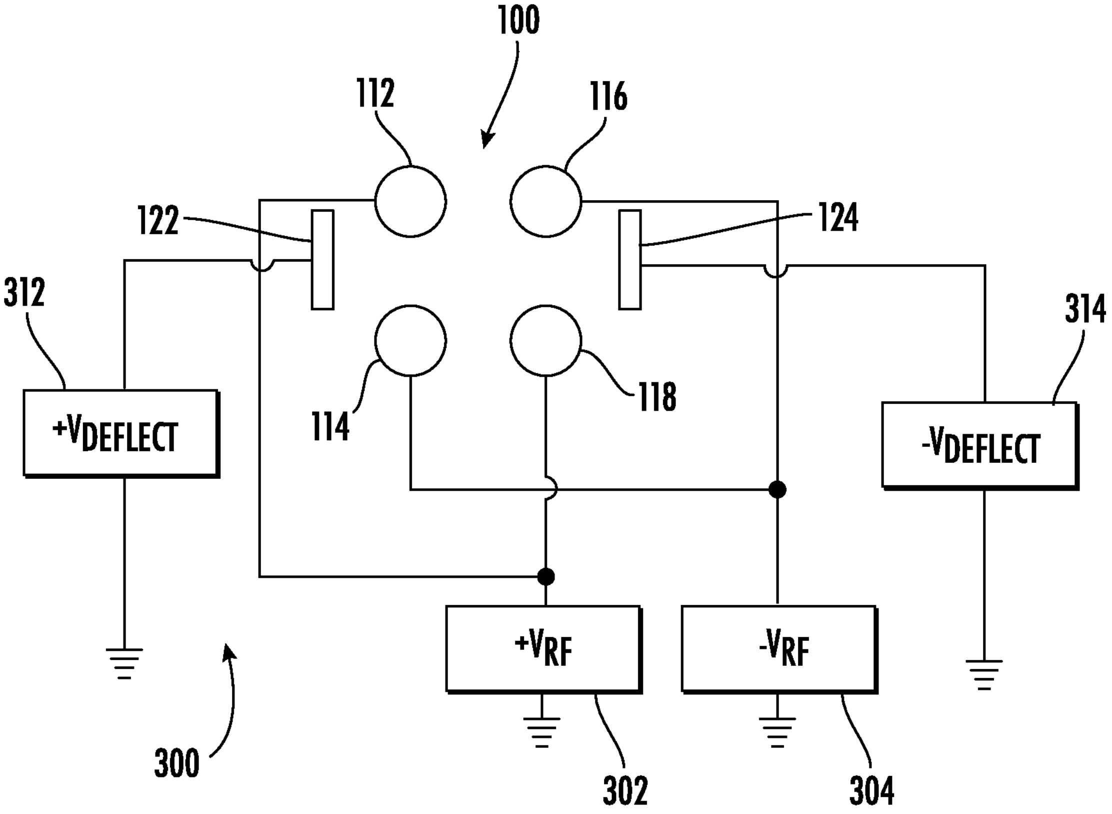
FIG. 5 is a schematic diagram of example circuitry that may be used with the ion guide of FIG. 4.

FIG. 5 is a simplified schematic view of example circuitry 300 that may be placed in communication with the ion guiding electrodes 112, 114, 116, and 118 and the ion deflecting electrodes 122 and 124 of the ion guide 100. The circuitry 300 generally includes a device for applying a two-dimensional (or radial) RF guiding field across the ion guide region defined within the arrangement of ion guiding electrodes 112, 114, 116, and 118, and a device for applying a radial DC deflecting field across the ion guide region. These devices may be embodied in one or more DC and RF voltage sources, signal generators, or the like. Because the present embodiment provides a pair of electrodes 122 and 124 dedicated for establishing the radial DC deflecting field, only RF voltage sources need to be placed in signal communication with the ion guiding electrodes 112, 114, 116, and 118, and only DC voltage sources need to be placed in signal communication with the ion deflecting electrodes 122 and 124. Thus, in the schematic diagram of FIG. 5, a voltage source 302 applies a voltage of $+V_{RF}$ to the interconnected pair of ion guiding electrodes 112 and 118, a voltage source 304 applies a voltage of $-V_{RF}$ to the interconnected pair of ion guiding electrodes 114 and 116, a voltage source 312 applies a voltage of $+V_{Deflect}$ to the outer ion deflecting electrode 122, and a voltage source 314 applies a voltage of $-V_{Deflect}$ to the inner ion deflecting electrode 124. It will be understood that the polarities of the DC voltage sources 312 and 314 may be switched for negative ions.

As noted above in conjunction with FIG. 3, an axial DC electric field may be applied to the ion guide 100 along the central axis 102 in addition to the radial DC electric field.

Figure 6:
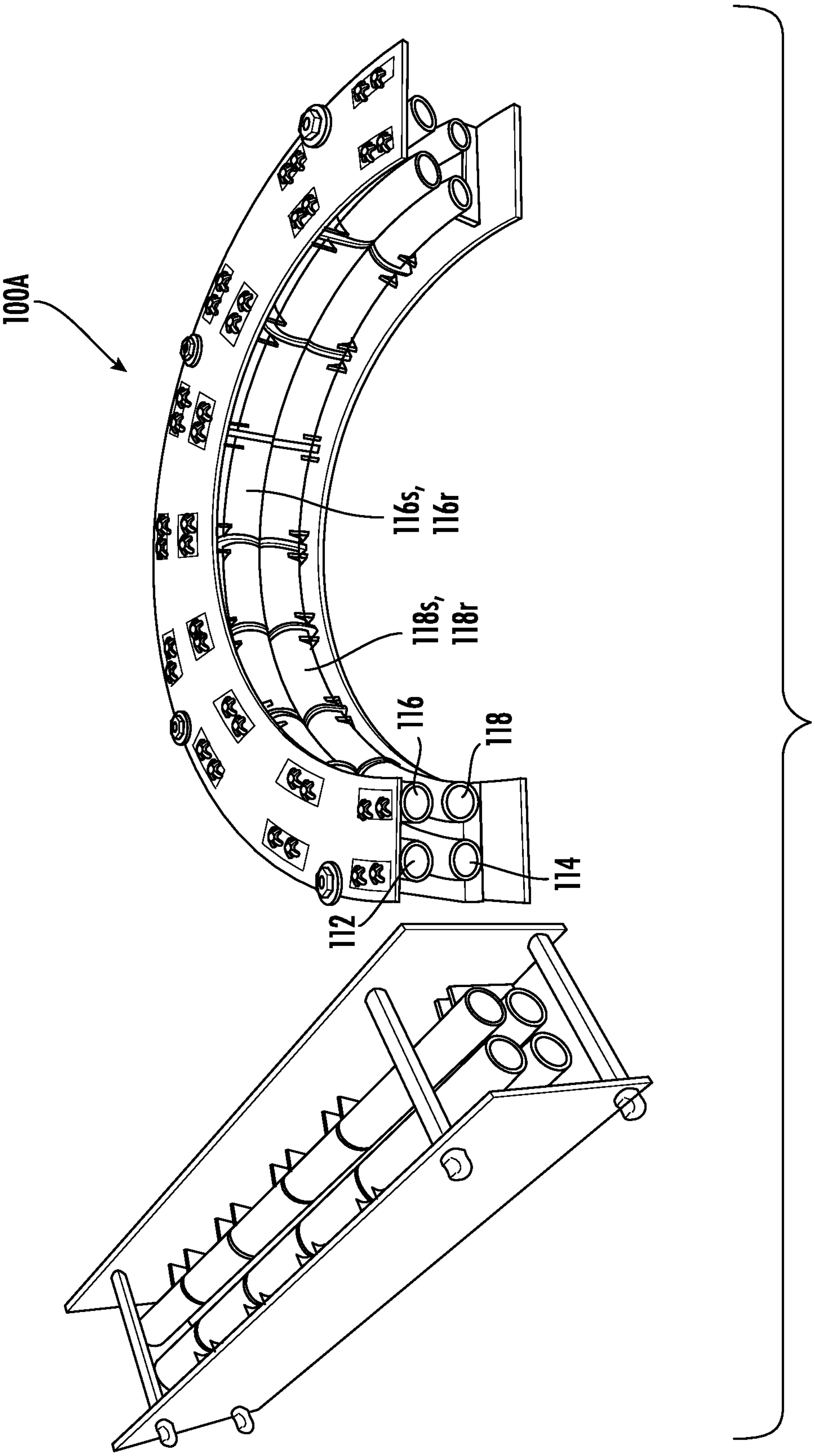
FIG. 6 is a perspective view of an ion guide according to some other embodiments.
Figure 7:
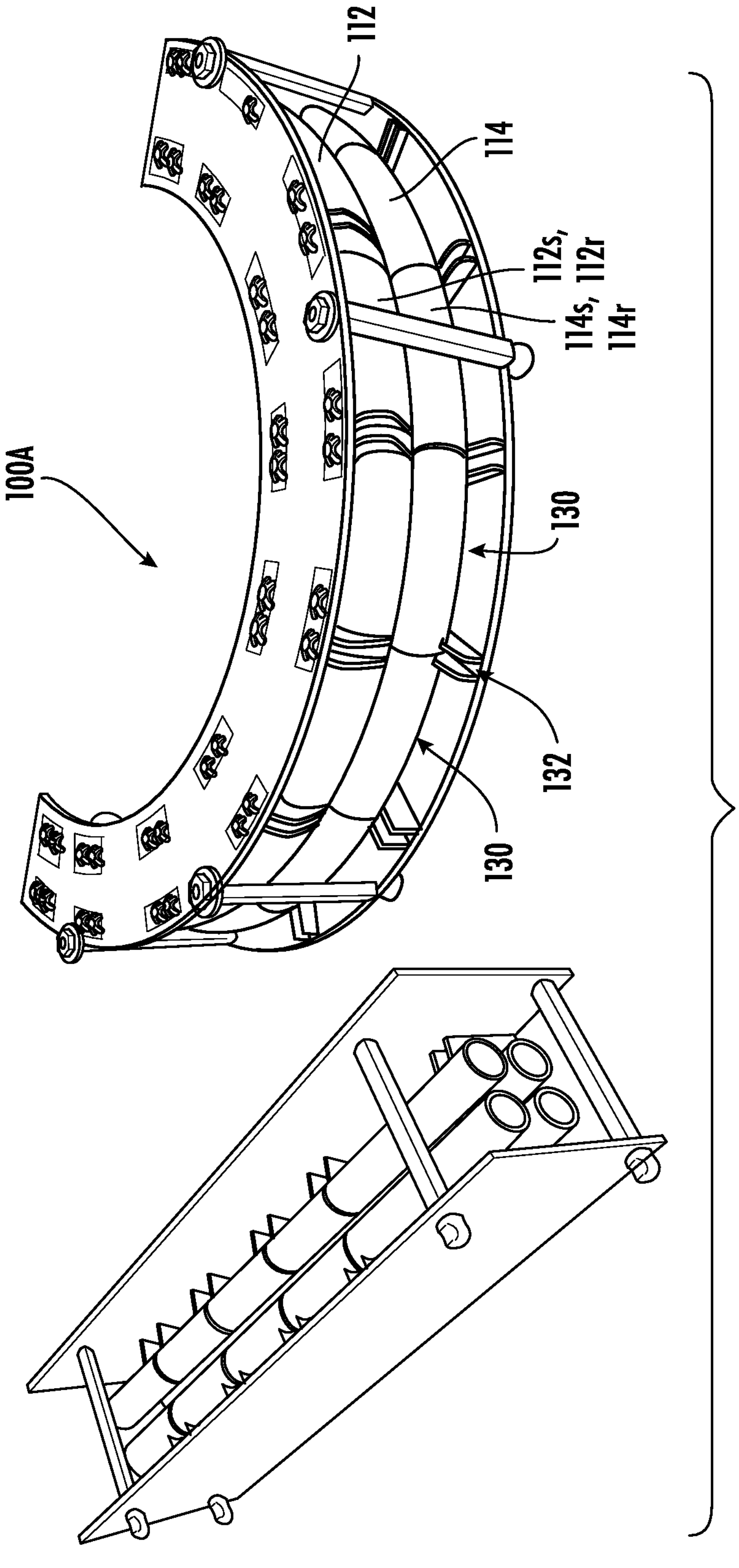
FIG. 7 is another perspective view of the ion guide of FIG. 6.

An ion guide 100A according to some embodiments is illustrated in FIGS. 6 and 7. The ion guide 100A may, for example, be utilized as the ion guide 100 described above and illustrated in FIG. 1 and as part of the accompanying the ion processing system 10. The ion guide 100A includes a plurality of the electrodes 112, 114, 116, and 118 that each include a coil or spring 112*s* 114*s*, 116*s*, and 118*s*. The coil or spring (e.g., extension spring) can provide several advantages. The spring is easy to bend into any shape to form smooth, curved ion guides. The use of the springs allows for low-cost ion guides to reduce cost of instruments (e.g., mass spectrometers). The ion guide can be quickly prototyped and manufactured at least in part because no machining of the electrodes is required. The ion guide using the springs is inexpensive to replace when necessary or desired. Because of the low cost, several sections can be employed to achieve a fine DC gradient.

In some embodiments, the coil or spring of each electrode includes resistance wire 112*r* 114*r*, 116*r*, and 118*r* (e.g., resistive coil). A unique advantage of using a coil structure for the electrodes is the enablement of a gradual DC voltage along the ion guide by using a resistive wire material. Using a coil structure can significantly increase the physical wire length compared to the length of the coil. By using a resistive wire material (e.g., nichrome) to build the coil, there is substantial resistance along the coil due to the significant increase in wire length, such that a differential voltage can drive both ends of the coil without incurring too much DC power to heat up the wire. A gradually changing DC voltage can be easily introduced along the ion guide to build up a drift (axial) voltage, which may be necessary to drive the ions to compensate for the energy loss due to collision with the gas molecules inside a collision cell. It can be advantageous that the DC field is continuous rather than discrete.

Unlike a multi-section ion guide with expensive machined parts (electrodes), the ion guide 100A shown in FIGS. 6 and 7 can employ multiple inexpensive coils or springs to create a low voltage ion guide with relatively fine deflecting (bend) and drift field gradients. The ion guide 100A may include a plurality of sections or segments 130 with a spacer 132 between adjacent ones of the sections 130.

The ion guide 100A may be configured as shown in FIG. 2 and have a voltage biasing scheme as shown in FIG. 3. Alternatively, the ion guide 100A may be configured as shown in FIG. 4 and have a voltage biasing scheme as shown in FIG. 5.

Figure 8:
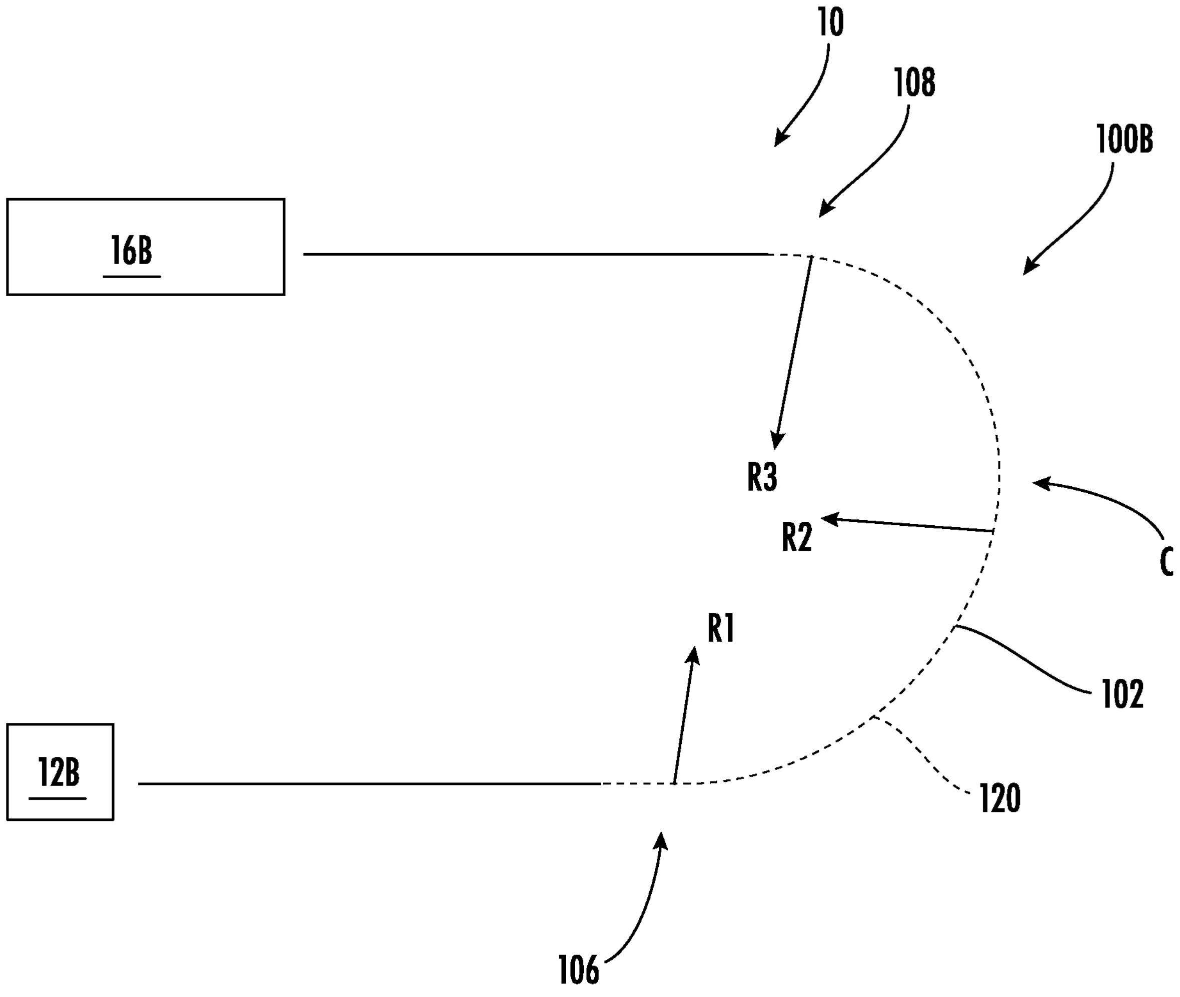
FIG. 8 is a schematic diagram of an ion guide and an associated ion processing system according to some other embodiments.

An ion guide 100B according to some other embodiments is illustrated in FIG. 8. The ion guide 100B may, for example, be utilized as the ion guide 100 described above and illustrated in FIG. 1 and as part of the accompanying the ion processing system 10. The ion guide 100B includes a plurality of curved electrodes 112, 114, 116, 118 (see, e.g., FIGS. 2-5) along a curved central axis 102. The plurality of curved electrodes 112, 114, 116, 118 define a curved ion guide region 120 (see, e.g., FIGS. 2-5) beginning at an ion entrance 106 and ending at an ion exit 108. The ion guide region 120 has a radius of curvature that varies along the curved central axis 102.

In some embodiments, the radius of curvature of the ion guide region 120 is at a maximum at or adjacent the ion entrance 106 and decreases along the curved central axis 102 toward the ion exit 108. In some embodiments, the radius of curvature of the ion guide region 120 is at a minimum at or adjacent the ion exit 108. For example, referring to FIG. 8, the ion guide region 120 may have a radius of curvature R1 at or adjacent the ion entrance 106 and a radius of curvature R3 at or adjacent the ion exit 108, with the radius of curvature R1 greater than the radius of curvature R3. The ion guide region 120 may have a radius of curvature R2 at a point between the ion entrance 106 and the ion exit 108, with the radius of curvature R2 having a value between that of the radius of curvature R1 and the radius of curvature R3.

Some known ion guides maintain the same radius of curvature along the entire guide (e.g., a circular bend). However, the present inventors have recognized and appreciated that the circular bend may not be an optimal arrangement. Ions entering the ion guide (or collision cell) travel faster and have more kinetic energy, e.g., because they have not yet been exposed to collision gas. These ions tend to go straight and therefore it is undesirable for the ion guide to have a large bend at the entrance. As the ions proceed through the collision gas, they cool down and have lower energy and can be bent along a tighter curvature. Thus, the optimal ion guide may have a variable curvature rather than a constant radius of curvature such as a circular section. For example, the bend of the ion guide may be a spiral (i.e., increase the curvature from the ion entrance to the ion exit) for a compact footprint and an ideal structure for transmission.

In some embodiments, the ion guide 100 may be employed as or included in a collision or reaction cell C in a quadrupole mass analyzer or quadrupole mass spectrometer that is included in the ion processing system 10. The geometry of the ion guide 100 described above can work well in practice because a downstream HED detector 16B with associated decoupling caps and feedthroughs likely need more space than an upstream ion source 12B. The ion guide 100B or collision cell C with varying bend may help to align the HED detector 16B and ion source 12B end to end.

In some embodiments, the electrodes 112, 114, 116, 118 of the ion source 100B may include coils or springs in a similar way to the ion guide 100A shown in FIGS. 6 and 7.

The ion guide 100B may be configured as shown in FIG. 2 and have a voltage biasing scheme as shown in FIG. 3. Alternatively, the ion guide 100B may be configured as shown in FIG. 4 and have a voltage biasing scheme as shown in FIG. 5.

Figure 9A:
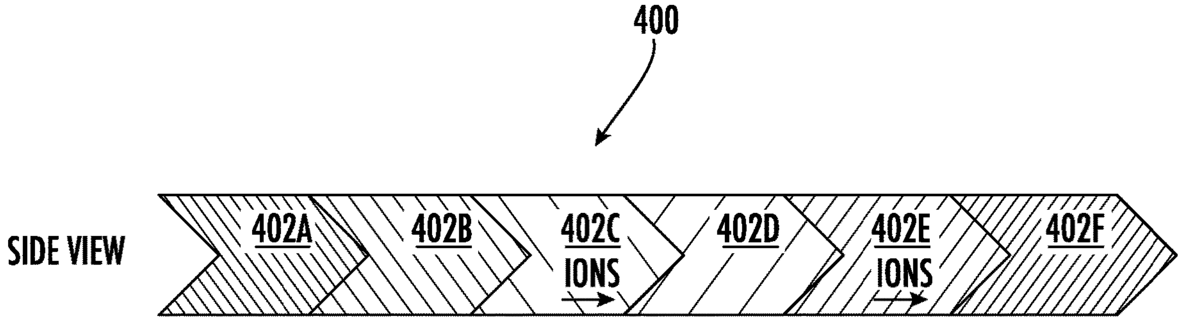
FIG. 9A is a side view of an electrode including electrode segments according to some embodiments.
Figure 9B:
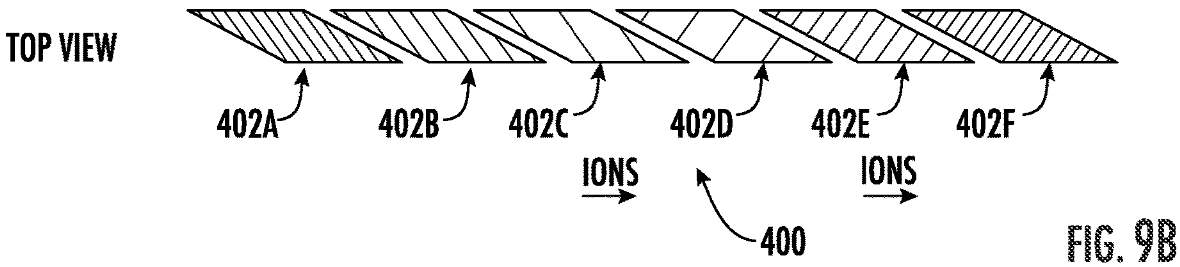
FIG. 9B is a top view of the electrode of FIG. 9A.

FIGS. 9A and 9B are side and top views, respectively, of an electrode 400 that can be used as one of the electrodes in the ion guide 100 (FIGS. 1-5) or the ion guide 100B (FIG. 8). The electrode 400 includes a plurality of sections or segments, illustrated as 402A-402F. Although six electrode segments are illustrated, it is contemplated that fewer than six or greater than six electrodes may be employed.

Adjacent ones of the electrode segments 402A-402F may be axially spaced apart from one another (e.g., along the curved central axis such as the central axis 102 shown in FIG. 1). Ends of adjacent ones of the electrode segments 402A-402F may axially overlap one another (e.g., along the curved central axis such as the central axis 102 shown in FIG. 1).

The overlapping portions of the electrode segments are tapered and weighted. This configuration can provide a more continuous and gradual DC gradient field using discrete electrodes or electrode segments (e.g., compared to discrete metal electrodes or electrode segments that do not include the overlapping design).

The present technology has been described herein with reference to the accompanying drawings, in which illustrative embodiments of the technology are shown. In the drawings, the relative sizes of regions or features may be exaggerated for clarity. This technology may, however, be embodied in many different forms and should not be construed as limited to the embodiments set forth herein; rather, these embodiments are provided so that this disclosure will be thorough and complete, and will fully convey the scope of the technology to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present technology.

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the term “below” can encompass both an orientation of above and below. The device may be otherwise oriented (rotated 90° or at other orientations) and the spatially relative descriptors used herein interpreted accordingly.

As used herein, the singular forms “a”, “an” and “the” are intended to include the plural forms as well, unless expressly stated otherwise. It will be further understood that the terms “includes,” “comprises,” “including” and/or “comprising,” when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being “connected” or “coupled” to another element, it can be directly connected or coupled to the other element or intervening elements may be present. As used herein, the term “and/or” includes any and all combinations of one or more of the associated listed items.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present technology are explained in detail in the specification set forth herein.

Unless otherwise defined, all terms (including technical and scientific terms) used herein have the same meaning as commonly understood by one of ordinary skill in the art to which this technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The foregoing is illustrative of the present technology and is not to be construed as limiting thereof. Although a few example embodiments of this technology have been described, those skilled in the art will readily appreciate that many modifications are possible in the example embodiments without materially departing from the teachings and advantages of this technology. Accordingly, all such modifications are intended to be included within the scope of this technology as defined in the claims. The technology is defined by the following claims, with equivalents of the claims to be included therein.

What is claimed is:

1. An ion guide comprising:

a plurality of curved electrodes arranged along a curved central axis, wherein the plurality of electrodes define a curved ion guide region, the curved ion guide region beginning at an ion entrance and ending at an ion exit; and an ion deflecting device configured to apply a radial DC electric field across the ion guide region and along the curved central axis, wherein the ion guide region has a radius of curvature that varies along the curved central axis, and wherein the radius of curvature is at a maximum at the ion entrance and decreases along the curved central axis toward the ion exit such that the radius of curvature is at a minimum at the ion exit.

2. The ion guide of claim 1 wherein each electrode comprises a coil or spring.

3. The ion guide of claim 2 wherein the coil or spring comprises resistance wire.

4. The ion guide of claim 1 wherein each electrode comprises a plurality of electrode segments, and wherein adjacent electrode segments are axially spaced apart from one another along the curved central axis.

5. The ion guide of claim 4 wherein ends of adjacent electrode segments axially overlap one another along the curved central axis.

6. The ion guide of claim 1 wherein the ion deflecting device comprises a DC voltage source configured to apply a DC voltage to at least one pair of the plurality of electrodes.

7. The ion guide of claim 1 further comprising a RF voltage generator configured to apply an RF voltage to at least one pair of the plurality of electrodes.

8. The ion guide of claim 1 wherein the ion deflecting device comprises a pair of opposing, curved ion deflecting electrodes extending parallel to the curved central axis and positioned outside the ion guide region.

9. The ion guide of claim 8 wherein the ion deflecting device further comprises a DC voltage source configured to apply a DC voltage of a first magnitude to one of the ion deflecting electrodes and a DC voltage of a second magnitude to the other one of the ion deflecting electrodes.

10. An ion guide comprising:

a plurality of curved electrodes arranged along a curved central axis, wherein the plurality of electrodes define a curved ion guide region; and an ion deflecting device configured to apply a radial DC electric field across the ion guide region and along the curved central axis, wherein each electrode comprises a coil or spring, wherein the curved ion guide region begins at an ion entrance and ends at an ion exit, wherein the ion guide region has a radius of curvature that varies along the curved central axis, and wherein the radius of curvature is at a maximum at the ion entrance and is at a minimum at the ion exit.

11. The ion guide of claim 10 wherein the coil or spring comprises resistance wire.

12. The ion guide of claim 10 wherein the coil or spring has a constant circular cross section.

13. The ion guide of claim 10 wherein each electrode comprises a plurality of electrode segments each including a coil or spring, and wherein adjacent electrode segments are axially spaced apart from one another along the curved central axis.

14. The ion guide of claim 10 wherein the ion deflecting device comprises a DC voltage source configured to apply a DC voltage to at least one pair of the plurality of electrodes.

15. The ion guide of claim 10 further comprising a RF voltage generator configured to apply an RF voltage to at least one pair of the plurality of electrodes.

16. The ion guide of claim 10 wherein the ion deflecting device comprises a pair of opposing, curved ion deflecting electrodes extending parallel to the curved central axis and positioned outside the ion guide region.

17. The ion guide of claim 16 wherein the ion deflecting device further comprises a DC voltage source configured to apply a DC voltage of a first magnitude to one of the ion deflecting electrodes and a DC voltage of a second magnitude to the other one of the ion deflecting electrodes.

18. An ion guide comprising:

a plurality of curved electrodes arranged along a curved central axis, wherein the plurality of electrodes define a curved ion guide region; and an ion deflecting device configured to apply a radial DC electric field across the ion guide region and along the curved central axis, wherein each electrode comprises a plurality of electrode segments, wherein adjacent electrode segments are axially spaced apart from one another along the curved central axis, and wherein ends of adjacent electrode segments axially overlap one another along the curved central axis.

19. The ion guide of claim 18 wherein the curved ion guide region begins at an ion entrance and ends at an ion exit, wherein the ion guide region has a radius of curvature that varies along the curved central axis, and wherein the radius of curvature is at a maximum at the ion entrance and is at a minimum at the ion exit.

* * * * *